Patented May 10, 1949

2,469,469

UNITED STATES PATENT OFFICE 2,469,469

OXIDATION INHIBITORS

Herman D. Kluge, Wappingers Falls, and Edwin C. Knowles, Beacon, N. Y., assignors to The Texas Company, New York, N. Y., a corporation of Delaware No Drawing. Application June 18, 1946, Serial No. 677,520

4 Claims. (Cl. 252—54)

This invention relates to a method of retarding the oxidation deterioration of organic materials, such as petroleum products, fatty oils, drying oils, rubber and the like, and to the oxidation resistant products resulting therefrom.

It has been found that substituted phenols containing a tertiary alkyl radical in the ortho position and a halogen atom in the para position are effective as inhibitors of oxidation when incorporated in organic materials normally subject to oxidation deterioration, and, furthermore, possess the added advantage in that they are unusually effective against oxidation deterioration in aqueous systems or under conditions of catalyzed oxidation in the presence of water where the majority of conventional antioxidants lose their efficiency. The inhibitors of the invention are those phenols, and particularly the water-insoluble phenols, which are substituted by at least a tertiary alkyl radical in the ortho position and a halogen atom in the para position. Further substitution in the remaining ortho position may be made as desired in order to modify the anti-oxidant characteristics or impart additional improving properties to the compound in accordance with the particular conditions of application and use.

The preferred embodiment of the invention includes the class of inhibitors which may be represented by the following structural formula:

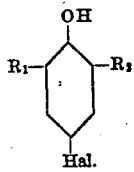

in which $R_1$ represents a tertiary alkyl radical, Hal. represents a halogen atom, and $R_2$ represents an aliphatic radical. In the more specific aspects of the invention, it is preferable that the halogen atom (Hal.) be a chlorine atom and that $R_2$ indicate another tertiary alkyl radical. The tertiary alkyl radicals which are represented by $R_1$ and by the preferred definition of $R_2$ may be isopropyl, tertiary butyl, tertiary amyl, tertiary hexyl, as well as tertiary alkyl radicals containing more than six carbon atoms.

Although these anti-oxidants may be applied to all the organic materials normally susceptible to oxidation deterioration, they are particularly desirable for use in petroleum oils, such as turbine oils which, under normal conditions of operation, involve oxidation deterioration in the presence of water. The amount of anti-oxidant incorporated in the materials to be inhibited will very considerably, depending upon the character of the material to be inhibited and the oxidizing conditions to which it is subjected. In the case of the turbine oils the amount of anti-oxidant used may very from 0.01 to 3% by weight.

In general, the anti-oxidants of the invention may be prepared in accordance with any of the conventional methods of synthesis applicable to these types of compounds. As an illustration of one of the methods of preparation, the following example, illustrating the preparation of 4-chloro-2,6-di-tertiary butylphenol, is presented:

A rapid stream of isobutylene was passed into a solution of para chlorophenol containing 5% by weight of concentrated sulfuric acid. The temperature was maintained at 70–80° C. (158–176° F.). When the proper increase in weight resulted, the alkylated phenol was washed with dilute sodium carbonate and then refluxed for four hours with 10% alcoholic potassium hydroxide. The alcohol was then stripped off, the product dissolved in ether, washed with water, and distilled. The main fraction boiled at 298–338° F. at about 20 millimeters of mercury and was a liquid. The last traces of this fraction solidified in the condenser. It was assumed that the solid material in the condenser was the dialkyl para chlorophenol and the main liquid fraction was the mono alkylated product. Accordingly, the above liquid fraction was realkylated, employing the same conditions as described above. On distillation, the main fraction boiling from 312–324° F. at 18 millimeters of mercury solidified. The product was recrystallized three times from alcohol and had a melting point of 79.0–79.5° C. (174.2–175.1° F.).

Analysis of the resulting 4-chloro-2,6-di-tertiary butylphenol was as follows:

|  | | Calculated | Found |
|---|---|---|---|
| Carbon | percent | 69.9 | 69.62 |
| Hydrogen | do | 8.78 | 8.84 |
| Chlorine | do | 14.72 | 14.30–14.51 |

The effectiveness of the compounds of the invention as anti-oxidants are demonstrated by the results obtained in the ASTM turbine oil oxidation test. In this test 300 ccs. of the mineral lubricating oil sample are introduced into an oxidation cell in which are suspended spiral coils of iron and copper, followed by the addition of 60 ccs. of distilled water. Oxygen is introduced through a fritted glass outlet into the oxidation cell at a rate of three liters per hour. The oxidation cell is suspended in a heated oil bath and the temperature in the cell is maintained at a constant temperature of 95° C. During the test samples of the oil are periodically withdrawn to determine the neutralization number and the test is terminated when the neutralization number of the sample reaches 2.0. The number of hours required to reach a neutralization number of 2.0 is indicative of the oxidation resistance of the particular oil sample.

The results set forth in the following table were obtained on a reference oil which was a solvent-refined, acid-treated and filtered mineral lubricating oil within the viscosity range of 485-515 Saybolt Universal seconds at 100° F.

Oxidation test

|  | Conc., Wt. percent | Hrs. to 2.0 Neut. No. |
|---|---|---|
| Reference Oil | | 75 |
| +4-chloro-2,6-di-tertiary butylphenol | 0.2 | 1,120 |
| | 0.6 | 1,520 |

Obviously many modifications and variations of the invention, as hereinbefore set forth, may be made without departing from the spirit and scope thereof and therefore only such limitations should be imposed as are indicated in the appended claims.

We claim:

1. A lubricant comprising a mineral lubricating oil normally subject to oxidation having incorporated therein about 0.01-3.0% by weight of a tri-substituted phenol of the formula

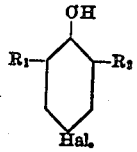

in which $R_1$ is a tertiary alkyl radical, Hal. is a halogen atom, and $R_2$ is a tertiary alkyl radical.

2. A lubricant according to claim 1, wherein Hal. is a chlorine atom.

3. A lubricant according to claim 1, wherein the tri-substituted phenol is 4-chloro-2,6, di-tertiary butylphenol.

4. A turbine oil comprising a mineral lubricating oil having incorporated therein about 0.2-0.6% by weight of 4-chloro-2,6-di-tertiary butylphenol.

HERMAN D. KLUGE.
EDWIN C. KNOWLES.

REFERENCES CITED

The following references are of record in the file of this patent:

UNITED STATES PATENTS

| Number | Name | Date |
|---|---|---|
| 1,995,063 | Harris | Mar. 19, 1935 |
| 2,180,008 | Lincoln | Nov. 14, 1939 |
| 2,195,510 | Cantrell | Apr. 2, 1940 |
| 2,250,384 | Lincoln | July 22, 1941 |
| 2,261,888 | Rocchini | Nov. 4, 1941 |
| 2,304,728 | Boyer | Dec. 8, 1942 |
| 2,310,710 | Rosenwald | Feb. 19, 1943 |

FOREIGN PATENTS

| Number | Country | Date |
|---|---|---|
| 270,283 | Great Britain | Oct. 20, 1927 |

OTHER REFERENCES

Organic Chemistry by Fieser, 1944, D. C. Heath & Co., page 637.